United States Patent
Choi et al.

(10) Patent No.: US 10,448,113 B2
(45) Date of Patent: Oct. 15, 2019

(54) DISPLAY APPARATUS AND METHOD OF CONTROLLING THE SAME

(71) Applicant: SAMSUNG ELECTRONICS CO., LTD., Suwon-si (KR)

(72) Inventors: Myung-kwan Choi, Suwon-si (KR); Young-sun Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 246 days.

(21) Appl. No.: 14/484,987

(22) Filed: Sep. 12, 2014

(65) Prior Publication Data

US 2015/0281794 A1    Oct. 1, 2015

(30) Foreign Application Priority Data

Mar. 25, 2014  (KR) .................. 10-2014-0034532

(51) Int. Cl.
*H04N 21/482* (2011.01)
*H04N 21/45* (2011.01)
(Continued)

(52) U.S. Cl.
CPC ..... *H04N 21/4821* (2013.01); *H04N 5/44543* (2013.01); *H04N 21/2668* (2013.01);
(Continued)

(58) Field of Classification Search
CPC ............. H04N 21/482; H04N 21/4821; H04N 21/4532; H04N 21/4826; H04N 21/4622; H04N 21/4312; H04N 21/6587; H04N 21/4668; H04N 5/44543; H04N 21/4825; H04N 21/4756; H04N 21/47214;
(Continued)

(56) References Cited

U.S. PATENT DOCUMENTS 6,577,350 B1 * 6/2003 Proehl ............... H04N 5/44543
                                                          348/460
7,076,202 B1    7/2006 Billmaier
(Continued)

FOREIGN PATENT DOCUMENTS

CN    1671193 A    9/2005
CN    1674651 A    9/2005
(Continued)

OTHER PUBLICATIONS

Bederson et al., "A Fisheye Calendar Interface for PDAs: Providing Overviews for Small Displays", Technical Reports from UMIACS, dated Jan. 21, 2013, available at http://drum.lib.umd.edu/bitstream/handle/1903/1201/CS-TR-4368.pdf.*
(Continued)

*Primary Examiner* — Chenea Davis
(74) *Attorney, Agent, or Firm* — Sughrue Mion, PLLC

(57) ABSTRACT

A display apparatus and a method of controlling the same are provided. The display apparatus includes a display configured to display a user interface (UI) comprising a plurality of display items corresponding to a plurality of broadcast contents and being displayed on a time axis which is formed of different time units, an input unit configured to receive a user command, and a controller configured to control the UI according to a user command received through the input unit.

21 Claims, 12 Drawing Sheets

(51) Int. Cl.
| | |
|---|---|
| *H04N 5/445* | (2011.01) |
| *H04N 21/262* | (2011.01) |
| *H04N 21/2668* | (2011.01) |
| *H04N 21/431* | (2011.01) |
| *H04N 21/458* | (2011.01) |
| *H04N 21/466* | (2011.01) |
| *H04N 21/472* | (2011.01) |
| *H04N 21/475* | (2011.01) |
| *H04N 21/845* | (2011.01) |

(52) U.S. Cl.
CPC ... *H04N 21/26291* (2013.01); *H04N 21/4312* (2013.01); *H04N 21/4532* (2013.01); *H04N 21/4586* (2013.01); *H04N 21/4661* (2013.01); *H04N 21/4667* (2013.01); *H04N 21/4668* (2013.01); *H04N 21/4756* (2013.01); *H04N 21/47214* (2013.01); *H04N 21/4825* (2013.01); *H04N 21/4826* (2013.01); *H04N 21/8456* (2013.01); *H04N 2005/44556* (2013.01)

(58) Field of Classification Search
CPC .......... H04N 21/4667; H04N 21/4661; H04N 2005/44556; H04N 21/2668; H04N 21/26291; H04N 21/8456; H04N 21/4586; H04L 67/30; H04L 67/306; G06Q 30/0269; H04W 4/028
See application file for complete search history.

(56) References Cited

U.S. PATENT DOCUMENTS

| | | | | |
|---|---|---|---|---|
| 7,900,228 | B2* | 3/2011 | Stark | H04N 5/44543 348/563 |
| 7,962,936 | B2 | 6/2011 | Fukuda et al. | |
| 8,028,316 | B2 | 9/2011 | Kawai | |
| 8,132,205 | B2* | 3/2012 | VanDuyn | H04N 5/44543 725/39 |
| 8,327,394 | B2* | 12/2012 | Jin | H04H 60/31 725/9 |
| 8,832,745 | B2* | 9/2014 | Stallings | H04N 21/42209 725/44 |
| 2001/0016945 | A1* | 8/2001 | Inoue | H04N 5/44543 725/44 |
| 2005/0235157 | A1 | 10/2005 | Cho et al. | |
| 2005/0235314 | A1 | 10/2005 | Choi | |
| 2005/0251825 | A1 | 11/2005 | Fukuda et al. | |
| 2008/0271075 | A1 | 10/2008 | Kawai | |
| 2009/0052864 | A1* | 2/2009 | Ohde | H04N 5/44543 386/298 |
| 2009/0158162 | A1 | 6/2009 | Imai | |
| 2009/0226101 | A1 | 9/2009 | Lessing | |
| 2010/0031193 | A1* | 2/2010 | Stark | G11B 27/034 715/810 |
| 2010/0107196 | A1* | 4/2010 | Kitayama | H04N 5/44543 725/46 |
| 2011/0265124 | A1* | 10/2011 | Goldenberg | G06F 3/0482 725/46 |
| 2012/0311634 | A1* | 12/2012 | VanDuyn | H04N 5/76 725/41 |
| 2013/0014194 | A1 | 1/2013 | Fukui | |
| 2013/0055304 | A1* | 2/2013 | Kirby | H04N 21/2365 725/31 |
| 2013/0055311 | A1* | 2/2013 | Kirby | H04N 21/4325 725/44 |
| 2014/0366061 | A1* | 12/2014 | Kim | H04N 21/8126 725/40 |
| 2015/0229981 | A1* | 8/2015 | Williams | H04N 21/25891 725/54 |
| 2015/0281794 | A1 | 10/2015 | Choi et al. | |

FOREIGN PATENT DOCUMENTS

| | | |
|---|---|---|
| CN | 103621103 A | 3/2014 |
| CN | 104954883 A | 9/2015 |
| EP | 1199887 A2 | 4/2002 |
| EP | 1429552 A2 | 6/2004 |
| EP | 1569445 A2 | 8/2005 |
| EP | 2 925 010 A1 | 9/2015 |
| JP | 6-119347 A | 4/1994 |
| JP | 4757192 B2 | 8/2011 |
| KR | 10-0421766 B1 | 3/2004 |
| KR | 10-2008-0112845 A | 12/2008 |
| KR | 4212229 B2 | 1/2009 |
| WO | 2012/176993 A2 | 12/2012 |

OTHER PUBLICATIONS

Communication dated Aug. 3, 2015, issued by the European Patent Office in counterpart European Patent Application No. 15159926.3.
Communication dated Aug. 31, 2018 issued by the State Intellectual Property Office of P.R. China in counterpart Chinese Application No. 201510134314.5.
Communication dated Mar. 28, 2019, issued by the State Intellectual Property Office of P.R. China in counterpart Chinese Application No. 201510134314.5.
Communication dated Jul. 9, 2019 issued by the State Intellectual Property Office of P.R. China in counterpart Chinese Application No. 201510134314.5.

* cited by examiner

FIG. 4A

| Timeline View | | | | Friday, May 13 08:00 PM | |
|---|---|---|---|---|---|
| On now | | | | Tomorrow | 410 |
| 08:00 PM1/20 | 09:00 PM | 10:00 PM | 11:00 PM | 00:00 AM | 01:00 AM |
| Thumbnail | Thumbnail | Thumbnail | Thumbnail | Thumbnail | Thumbn |
| CH logo | CH logo | CH logo | CH logo | CH logo | CH logo |
| humbnail | Thumbnail | Thumbnail | Thumbnail | Thumbnail | Thum n |
| CH logo | CH logo | CH logo | CH logo | CH logo | CH logo |
| Thumbnail | Thumbnail | Thumbnail | Dummy Image | Thumbnail | Thumbn |
| CH logo | CH logo | CH logo | | CH logo | CH logo |

FIG. 4B

| Timeline View | | | | | Thursday, May 15 08:00 PM | |
|---|---|---|---|---|---|---|
| Tomorrow | May 17 | May 18 | May 19 | May 20 | May 21 | 410 |
| 12:00 PM1/20 | Saturday | Sunday | Monday | Tuesday | Wednesd | |
| Thumbnail | Thumbnail | Thumbnail | Thumbnail | Thumbnail | Thumbn | |
| CH logo | CH logo | CH logo | CH logo | CH logo | CH logo | |
| Thumbnail | Thumbnail | Thumbnail | Thumbnail | Thumbnail | Thumbn | |
| CH logo | CH logo | CH logo | CH logo | CH logo | CH logo | |
| Thumbnail | Thumbnail | Thumbnail | Thumbnail | Thumbnail | Thumbn | |
| CH logo | CH logo | CH logo | | CH logo | CH logo | |

FIG. 5A

| Timeline View | | | | Friday, May 13 08:00 PM | |
|---|---|---|---|---|---|
| On now | | | | Tomorrow | 510 |
| 08:00 PM1/20 | 09:00 PM | 10:00 PM | 11:00 PM | 00:00 AM | 01:00 AM |
| Thumbnail Program Title 06:00PM~ 09:00PM | Thumbnail | Thumbnail | Thumbnail | Thumbnail | Thumbn |
| | CH logo | CH logo | CH logo | CH logo | CH logo |
| ‹humbnail | Thumbnail | Thumbnail | Thumbnail | Thumbnail | Thum›n |
| CH logo | CH logo | CH logo | CH logo | CH logo | CH logo |
| Thumbnail | Thumbnail | Thumbnail | Dummy Image | Thumbnail | Thumbn |
| CH logo | CH logo | CH logo | | CH logo | CH logo |

FIG. 6A

| Timeline View | | | | | Friday, May 13 08:00 PM |
|---|---|---|---|---|---|
| On now | 620 | | | Tomorrow | 610 |
| 08:00 PM1/20 | 09:00 PM | 10:00 PM | 11:00 PM | 00:00 AM | 01:00 AM |
| Thumbnail Program Title 06:00PM~ 09:00PM | Record | Thumbnail | Thumbnail | Thumbnail | Thumbn |
| | View Details | | | | |
| | Add to favorite | CH logo | CH logo | CH logo | CH logo |
| | Play | | | | |
| ‹humbnail | | Thumbnail | Thumbnail | Thumbnail | Thum›n |
| CH logo | CH logo | CH logo | CH logo | CH logo | CH logo |
| Thumbnail | Thumbnail | Thumbnail | Dummy Image | Thumbnail | Thumbn |
| CH logo | CH logo | CH logo | | CH logo | CH logo |

FIG. 6B

| Timeline View | | | | Friday, May 13 08:00 PM | |
|---|---|---|---|---|---|
| Yesterday | 630 | | Today | | 610 |
| 08:00 PM1/20 | 09:00 PM | 10:00 PM | 11:00 PM | 00:00 AM | 01:00 AM |
| Thumbnail Program Title 06:00PM~ 09:00PM | Play / View Details / Add to favorite | Thumbnail / CH logo | Thumbnail / CH logo | Thumbnail / CH logo | Thumbn / CH logo |
| ‹humbnail / CH logo | Thumbnail / CH logo | Thumbnail / CH logo | Thumbnail / CH logo | Thumbnail / CH logo | Thum›n / CH logo |
| Thumbnail / CH logo | Thumbnail / CH logo | Thumbnail / CH logo | Dummy Image / CH logo | Thumbnail / CH logo | Thumbn / CH logo |

FIG. 6C

| Timeline View | | | | Friday, May 13 08:00 PM | |
|---|---|---|---|---|---|
| Tomorrow | 640 | | | May 15 | May 16 |
| 08:00 PM1/20 | 09:00 PM | 10:00 PM | 11:00 PM | Sunday | Monday |
| Thumbnail Program Title 06:00PM~ 09:00PM | Scheduled Recording | Thumbnail | Thumbnail | Thumbnail | Thumbn |
| | Scheduled Play | CH logo | CH logo | CH logo | CH logo |
| ‹humbnail | View Details | Thumbnail | Thumbnail | Thumbnail | Thu›n |
| | Add to favorite | | | | |
| CH logo | CH logo | CH logo | CH logo | CH logo | CH logo |
| Thumbnail | Thumbnail | Thumbnail | Dummy Image | Thumbnail | Thumbn |
| CH logo | CH logo | CH logo | | CH logo | CH logo |
| | | | | | |

FIG. 7

| Timeline View | | | | Thursday, May 15 08:00 PM | |
|---|---|---|---|---|---|
| Tomorrow | May 17 | | May 18 | | May 19 |
| 12:00 PM1/20 | Morning | Afternoon | Morning | Afternoon | Monday |
| Thumbnail | Thumbnail | Thumbnail | Thumbnail | Thumbnail | Thumbn |
| CH logo | CH logo | CH logo | CH logo | CH logo | CH logo |
| Thumbnail | Thumbnail | Thumbnail | Thumbnail | Thumbnail | Thumbn |
| CH logo | CH logo | CH logo | CH logo | CH logo | CH logo |
| Thumbnail | Thumbnail | Thumbnail | Thumbnail | Thumbnail | Thumbn |
| CH logo | CH logo | CH logo | CH logo | CH logo | CH logo |

DISPLAY APPARATUS AND METHOD OF CONTROLLING THE SAME

CROSS-REFERENCE TO RELATED APPLICATION(S)

This application claims priority from Korean Patent Application No. 10-2014-0034532, filed on Mar. 25, 2014 in the Korean Intellectual Property Office, the disclosure of which is incorporated herein by reference in its entirety.

BACKGROUND

1. Field

Apparatuses and method consistent with exemplary embodiments relate to a display apparatus and a method of controlling the same, and more particularly, to a display apparatus that provides a broadcast guide user interface (UI) including a plurality of display items corresponding to broadcast contents.

2. Description of Related Art

An electronic program guide (EPG) provides users of television, radio, and other media applications with continuously updated menus displaying broadcast programming or scheduling information for current programming. An EPG is an application that may be used with digital set-top boxes and television sets to list current and scheduled programs that are or will shortly be available on each channel and a short summary or commentary for each program. An EPG is the electronic equivalent of a printed television program guide.

A display apparatus may provide various types of EPG information about broadcast content. However, the EPG typically provides information about broadcast content in a standardized format based on broadcast content information provided by a broadcast company.

Recently, the number of broadcast companies and types of broadcast content has significantly increased. As a result, the standardized EPG format has a limit in providing information about numerous broadcast contents. In particular, the EPG format may provide broadcast content information for a particular time unit (for example, an hour or half hour). However, a user has difficulty in searching through programs set to be broadcast in the future or that were broadcast in the past. Therefore, a simplified easier to use EPG format is needed.

SUMMARY

Exemplary embodiments overcome the above disadvantages and other disadvantages not described above. Also, an exemplary embodiment is not required to overcome the disadvantages described above, and an exemplary embodiment of the present inventive concept may not overcome any of the problems described above.

One or more exemplary embodiment provide a display apparatus which provides broadcast content information based on a time axis which is formed of different time units. Accordingly, a user is able to retrieve information on broadcast content to be played at a time in the future or in the past more easily and select a desired broadcast content.

According to an aspect of an exemplary embodiment, there is provided a display apparatus including a display configured to display a user interface (UI) including a plurality of display items corresponding to a plurality of broadcast contents and being displayed on a time axis which is formed of different time units, an input unit configured to receive a user command, and a controller configured to control the UI according to a user command received through the input unit.

The time axis may be formed of a date unit with respect to a date prior to a current date, formed of a time unit with respect to a date within a predetermined period from current date, and formed of a date unit with respect to a future date of the predetermined period.

The controller may arrange display items included at a same time unit on the time axis according to a recommended order of broadcast contents.

The recommended order may be determined based on at least one of a user's broadcast content view history, an audience rating, and a number of recommendations of other people.

The apparatus may further include a communication unit configured to receive broadcast content recommendation information from an external server at predetermined intervals. In addition, the controller may determine the recommended order using the broadcast content recommendation information received from the external server.

The display may display a bar-shaped graphic user interface (GUI) for browsing through time at a side of the time axis. In addition, in response to a user command selecting an area of the bar-shaped GUI being received through the input unit, the controller may control the display to display a display item included in a time unit corresponding to the selected area.

In response to a user command selecting one of the plurality of display items being received through the input unit, the controller may control the display to display a list of functions for broadcast content corresponding to the selected display item at a side of the selected broadcast item.

The list of functions may vary depending upon a point of time at which broadcast content corresponding to the selected display item is broadcasted.

In response to a broadcast item corresponding to the selected display item being broadcasted previously, the list may include at least one of a preferred broadcast adding item, a previous broadcast viewing item, and a broadcast information providing item, in response to a broadcast content corresponding to the selected display item being currently broadcasted, include at least one of a preferred broadcast adding item, a recording item, a broadcast viewing item, and a broadcast information providing item, and in response to a broadcast content corresponding to the selected display item being broadcasted in the future, include at least one of a preferred broadcast adding item, a scheduled recording item, a scheduled viewing item, and a broadcast information providing item.

According to an aspect of another exemplary embodiment, there is provided a method of controlling a display apparatus, the method including displaying a user interface (UI) including a plurality of display items corresponding to a plurality of broadcast contents and being display on a time axis which is formed of different time units, and controlling the UI according to a user command.

The time axis may be formed of a date unit with respect to a date prior to a current date, formed of a time unit with respect to a date within a predetermined period from the current date, and formed of a date unit with respect to a future date of the predetermined period.

The guide UI may arrange display items included at a same time unit on the time axis according to a recommended order of broadcast contents.

The recommended order may be determined based on at least one of a user's broadcast content view history, an audience rating, and a number of recommendations of other people.

The recommended order may be determined by broadcast content recommendation information received from an external server at predetermined intervals.

The displaying may include displaying a bar-shaped graphic user interface (GUI) for browsing through the plurality of time units at a side of the time axis. In addition, in response to a user command selecting an area of the bar-shaped GUI being received, the controlling may include displaying a display item included in a time unit corresponding to the selected area.

In response to a user command selecting one of the plurality of display items being received, the controlling may include displaying a list of functions for broadcast content corresponding to the selected display item at a side of the selected broadcast item.

The list of functions may vary depending upon a point of time at which broadcast content corresponding to the selected display item is broadcasted.

In response to a broadcast item being broadcasted previously, the list may include at least one of a preferred broadcast adding item, a previous broadcast viewing item, and a broadcast information providing item, in response to a broadcast content corresponding to the selected display item being currently broadcasted, include at least one of a preferred broadcast adding item, a recording item, a broadcast viewing item, and a broadcast information providing item, and in response to a broadcast content corresponding to the selected display item being broadcasted in the future, include at least one of a preferred broadcast adding item, a scheduled recording item, a scheduled viewing item, and a broadcast information providing item.

According to an aspect of another exemplary embodiment, there is provided a display apparatus including a display configured to display a user interface (UI) for broadcast content, the UI comprising an array having an axis of time including a plurality of units of time that vary in size based on a time at which the broadcast content is broadcast, and a controller configured to arrange a plurality of broadcast content items within the array, each broadcast content item comprising a representation of broadcast content and being two-dimensionally arranged in the array based on a unit of time at which the respective broadcast content is broadcast.

The broadcast content items for a current day may be arranged in first unit of time on the axis of time, and broadcast content items for a plurality of preceding days and a plurality of days following the current day may be arranged in a second unit of time on the axis of time that is greater than the first unit of time.

The broadcast content items for a current day and one or more days within a predetermined range of the current day may be arranged in a first unit of time on the axis of time, and broadcast content items for days outside the predetermined range may be arranged in a second unit of time on the axis of time that is greater than the first unit of time.

The broadcast content items for a current day may be arranged in units of hours on the axis of time, and broadcast content items for a plurality of preceding days and a plurality of days following the current day may be arranged in units of days on the axis of time.

The plurality of broadcast content items may comprise a plurality of thumbnail images that comprise summarized representations of broadcast content.

The array of the UI may comprise an electronic program guide (EPG) in which units of time are arranged in a column direction of the array, and a width of each column of the EPG is a same size.

The controller may be configured to two-dimensionally arrange a plurality of items corresponding to a plurality of rows in a column of the array corresponding to a same unit of time, based on at least one of a user preference of the broadcast content and recommendation information of the broadcast content.

BRIEF DESCRIPTION OF THE DRAWINGS

The above and/or other aspects will be more apparent by describing certain exemplary embodiments with reference to the accompanying drawings, in which:

FIGS. 4A and 4B are diagrams illustrating a guide UI including a time axis which is formed of different time units according to an exemplary embodiment;

FIGS. 5A and 5B are diagrams illustrating a date browsing bar of a guide UI according to an exemplary embodiment;

FIGS. 6A, 6B and 6C are diagrams illustrating a list of functions provided according to a point of time when broadcast content is broadcasted according to an exemplary embodiment;

FIG. 7 is a diagram illustrating a guide UI including a time axis which is formed of different time units according to an exemplary embodiment.

DETAILED DESCRIPTION

Figure 1:
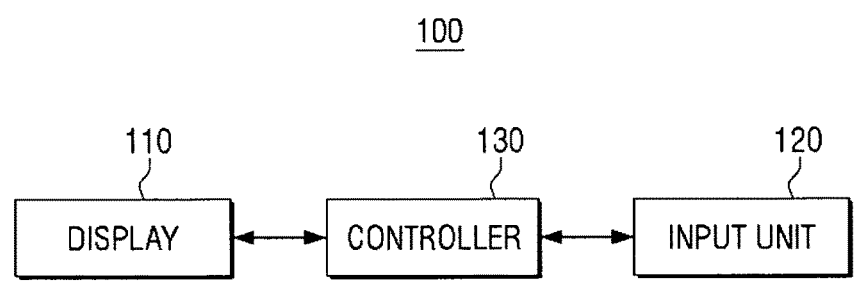
FIG. 1 is a block diagram illustrating a display apparatus according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail because they would obscure the application with unnecessary detail.

FIG. 1 is a block diagram illustrating a display apparatus according to an exemplary embodiment. Referring to FIG. 1, display apparatus 100 includes a display 110, an input unit 120, and a controller 130. For example, the display apparatus 100 may be or may be included in a smart television (TV), a set-top box, a gaming console, a computer, a smart phone, a tablet personal computer (PC), a desktop PC, a laptop PC, a projection TV, and the like.

The display apparatus 100 displays image data and various user interfaces (UIs), for example, according to control of the controller 130. In particular, the display 110 may display a guide UI including a plurality of display items corresponding to a plurality of broadcast content. For example, the guide UI may include an electronic program guide (EPG), an interactive program guide (IPG), and the like.

The guide UI may include a time axis which is formed of different time units. Within the guide UI a plurality of display items may be arranged based on the time axis. For example, the time axis included in the guide UI may be formed of a date unit with respect to a date in the past, formed of a time unit with respect to a date within a predetermined period from today (for example, tomorrow), formed of a date unit with respect to a date in a future, and the like.

The input unit 120 receives a user command for controlling the display apparatus 100. As an example, the input unit 120 may receive a user command for selecting a display item included in the guide UI.

The controller 130 may control the overall operations of the display apparatus 100 according to a user command received through the input unit 120. In response to receiving a command for generating a guide UI through the input unit 120, the controller 130 may control the display 110 to display a guide UI including a plurality of display items corresponding to broadcast contents.

The guide UI may include a time axis which is formed of different time units, and may display the items based on the time axis. For example, the time axis may arrange and display the display items on the same time unit based on the time axis according to a recommendation order of the broadcast contents. The recommendation order may be determined based on a user's broadcast content viewing history, an audience rating, a number of recommendations by other people, and the like. As another example, the controller 130 may receive broadcast content recommendation information from an external server at predetermined intervals, and determine the recommendation order based on the received broadcast content recommendation information.

The time units or units of time may be adjustable or otherwise changed. For example, the time units may be a half hour, one hour, one night, one day, one week, and the like. Accordingly, a user can look through images representing broadcast content based on a daily programming schedule, an hourly programming schedule, and the like. Furthermore, the controller 130 may arrange the images representing broadcast content in an order to recommend content to a particular user.

The controller 130 may control the display 110 to display a graphical user interface (GUI), for example, a bar-shaped GUI for browsing a time on a side of the time axis. In response to a user command for selecting a certain area of the bar-shaped GUI being received through the input unit, the controller 130 may control the display 110 to display an item included in a time unit corresponding to the selected area.

In response to a user command selecting one of the plurality of display items being received through the input unit 120, the controller 130 may control the display 110 to display a list of functions related to broadcast content corresponding to the selected display item on a side of the selected broadcast item. The list of functions related to the content may vary depending upon a point of time when a broadcast content corresponding to the selected display item is broadcasted. For example, if the selected display item was broadcasted in the past, the list may include at least one of a preferred broadcast adding item, a previous broadcast viewing item, and a broadcast information providing item. As another example, if the selected display item is currently being broadcasted, the list of functions may include at least one of a preferred broadcast adding item, a recording item, a broadcast viewing item, and a broadcast information providing item. As another example, if the selected display item is going to be broadcasted in the future, the function list may include at least one of a preferred broadcast adding item, a scheduled recording item, a scheduled viewing item, and a broadcast information providing item.

According to various aspects, a guide UI including a time axis which is formed of different time units according to date, may be provided based on a current time. Accordingly, a user is able to search for a preferred broadcast content more easily through the guide UI including a time axis which is formed of different time units, even if the user does not know an exact time that broadcast content was broadcasted in the past or will be broadcasted in the future.

Hereinafter, a display apparatus according to exemplary embodiments is described with reference to FIGS. 2 through 7.

Figure 2:
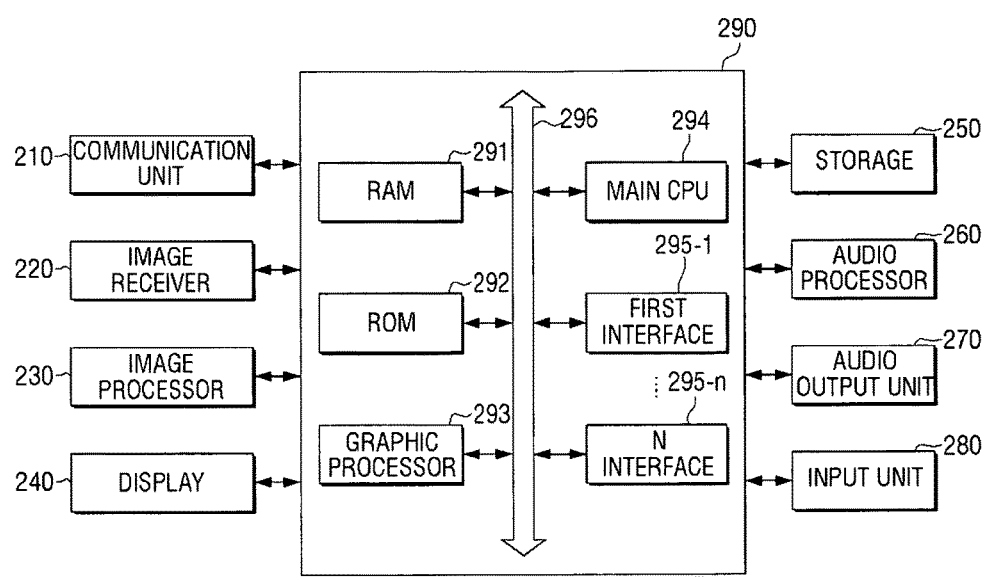
FIG. 2 is a block diagram illustrating a display apparatus according to another exemplary embodiment.

FIG. 2 is a block diagram illustrating a display apparatus 200 according to another exemplary embodiment. Referring to FIG. 2, the display apparatus 200 includes a communication unit 210, an image receiver 220, an image processor 230, a display 240, a storage 250, an audio processor 260, an audio output unit 270, an input unit 280, and a controller 290.

The communication unit 210 may communicate with various types of external apparatuses according to various types of communication methods. For example, the communication unit 210 may include various communication chips such as a WI-FI chip, a BLUETOOTH chip, a Near Field Communication (NFC) chip, a wireless communication chip, an Infrared Rays (IR) chip, and the like. The WI-FI chip, the BLUETOOTH chip, the wireless communication chip, and the IR chip perform communication in a WI-FI method, a Bluetooth-BLUETOOTH method, a NFC method, and an IR method, respectively.

The NFC chip operates in a NFC method which may use a frequency band of 13.56 MHz from among various Radio Frequency-Identification (RF-ID) frequency bands such as 135 kHz, 13.56 MHz, 433 MHz, 860 to 960 MHz, 2.45 GHz, and the like. The WI-FI chip or the BLUETOOTH chip may transmit various pieces of connection information, such as Subsystem Identification (SSID) and a session key to connect. Various pieces of information may be transmitted and received by connecting communication using the connection information. The wireless communication chip may communicate according to various communication standards such as INSTITUTE OF ELECTRICAL AND ELECTRONICS ENGINEERS (IEEE), ZIGBEE, 3RD GENERATION (3G), 3RD GENERATION PARTNERSHIP PROJECT (3GPP), LONG TERM EVOLUTION (LTE), and the like.

The communication unit 210 may receive broadcast content recommendation information from an external server. As a non-limiting example, the broadcast content recommendation information may include audience rating information on broadcast contents, evaluation information of other people on the broadcast contents, and the like.

The image receiver 220 receives image content from various external sources. As an example, the image receiver 220 may receive broadcast contents from an external broadcast station. As another example, the image receiver 220 may receive image contents from an external apparatus such as a server, a BLU-RAY disk, a Digital Versatile Disk (DVD), and the like.

The image processor 230 may process image data received by the image receiver 220. The image processor 230 may perform various image processing operations, for example, decoding, scaling, noise filtering, frame rate conversion, resolution conversion, and the like, with respect to the image data.

The display 240 may display a video frame in which the image data received from the image receiver 220 is processed by the image processor 230. The image processor 230 may also display various screens generated by a graphic processor 293. According to various aspects, the display 240 may display a plurality of display items on a time axis based on a current time. The plurality of display items may be formed of different time units depending upon a date.

The storage 250 may store various modules for operating the display apparatus 200. For example, the storage 250 may store software including one or more of a base module, a sensing module, a communication module, a presentation module, a web browser module, a function module, and the like. In this example, the base module is a basic module which processes a signal transmitted from hardware included in the display apparatus 200 and transmits the signal to an upper layer module. The sensing module collects information from various sensors, and analyzes and manages the collected information. For example, the sensing module may include a face recognition module, a voice recognition module, a motion recognition module, a NFC recognition module, and the like. The presentation module configures a display screen, and may include a multimedia module for reproducing and outputting multimedia content and a UI rendering module for processing a UI and graphics. The communication module communicates with an external source. The web browser module accesses a web server to perform web browsing. The function module includes various applications for providing various functions.

The modules described herein are merely for purposes of example. It should be appreciated that the storage 250 may include various program modules, also various program modules may be omitted, modified, or added according to a type and a characteristic of the display apparatus 200. For example, if the display apparatus 200 is a smart phone or a tablet PC, the base module may further include a location determining module for determining a location of the display apparatus 200 based on a Global Positioning System (GPS), and the sensing module may further include a sensing module for sensing a user motion.

The storage 250 may store the broadcast content recommendation information that is transmitted by and received from an external server and information about a user's broadcast content view history.

The audio processor 260 processes audio data. The audio processor 260 may perform various processing operations, for example, decoding, amplifying, noise filtering, and the like, with respect to the audio data. The audio data processed by the audio processor 260 may be output to the audio output unit 270. The audio output unit 270 outputs various notification sounds or voice messages as well as various audio data processed by the audio processor 260.

The input unit 280 receives various user commands for controlling the display apparatus 200. As a non-limiting example, the input unit 280 may include a remote controller which is provided with a four-directional key for moving a highlight or a pointing device which is provided with a motion sensor for moving a pointer. As another example, the input unit 280 may include various input devices such as a keyboard, a mouse, a motion input unit, a voice input unit, a touch sensor, and the like.

The controller 290 controls overall operations of the display apparatus 200, for example, by using various programs stored in the storage 250. In the example of FIG. 2, the controller 290 includes a Random Access Memory (RAM) 261, a Read-Only Memory (ROM) 292, the graphic processor 293, a main Central Processing Unit (CPU) 294, first through $n^{th}$ interfaces 295-1 to 295-n, and a bus 296. In this example, the RAM 291, the ROM 292, the graphic interface 293, the CPU 294, and the first through n interfaces 295-1 to 295-$n^{th}$ are connected to each other through the bus 296.

The ROM 292 may be used to store a command set for booting a system such as the display apparatus 200. In response to a turn-on command being received and power being supplied, the main CPU 294 copies an Operating System (O/S) stored in the storage 250 into the RAM 291 according to the booting command stored in the ROM 292, and executes the O/S thereby booting the system. Upon completion of booting, the main CPU 294 may copy various application programs stored in the storage 250 into the RAM 291, and execute the application programs copied into the RAM 291 thereby performing various operations.

The graphic processor 293 may generate a screen including various objects, for example, a pointer, an icon, an image, a text, and the like, using a calculator (not shown) and a rendering unit (not shown). The calculator may calculate an attribute value, such as a coordinate value in which each object is displayed, a shape, a size, a color, and the like, according to a layout of a screen, using a control command received from the input unit. The rendering unit may generate a screen having objects and various layouts based on an attribute value calculated by the calculator. The generated screen is displayed within a display area of the display 240.

The main CPU 294 may access the storage 250, and perform a booting operation using the O/S stored in the storage 250. In addition, the main CPU 294 performs various operations using various programs, contents, and data stored in the storage 250.

The first to $n^{th}$ interfaces 295-1 to 295-n may be connected to the aforementioned various components. One or more of the interfaces may be a network interface which may be used to connect to an external apparatus through a network.

In response to receiving a user command via the input unit 280 for generating a guide UI recommending broadcast content, the controller 290 may control the display 240 to display a guide UI including a plurality of display items corresponding to a plurality of broadcast contents. For example, the display items may include at least one of a thumbnail image of broadcast content, a title of broadcast content, information about a broadcast company, channel information, information about a broadcast start time, and the like.

Figure 3:
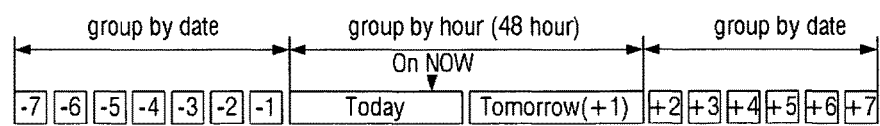
FIG. 3 is a diagram illustrating a time axis of a guide UI which is formed of different time units according to an exemplary embodiment.

The guide UI may include a time axis which is formed of different time units according to a date and based on a current time. The controller 290 may display a display item corresponding to a broadcast content based on the time axis which is formed of different time units. For example, as shown in FIG. 3, the guide UI may include a display item based on a date unit with respect to a date in the past, based on a time unit with respect to a date corresponding to today and tomorrow, based on a date unit with respect to a date after two days from the present, and the like.

As another example, in response to a user command for generating a guide UI recommending broadcast content being received through the input unit 280, the controller 290 may control the display 240 to display a guide UI such as that shown in FIG. 4A. In this example, the guide UI includes a time axis 410 which is formed of a time unit with respect to a date corresponding to today or tomorrow, based on the current time, 8:00 p.m., Friday, May 13. In this example, the time unit is one hour.

A user may desire to check on broadcast content that is to be broadcasted in the future. Accordingly, in response to a command for moving a highlight or a command for moving a display screen being received through the input unit 280, the controller 290 may control the display 240 to display a guide UI such as that shown in FIG. 4B. In this example, the guide UI includes a time axis 410 which is formed of a date unit with respect to a date after two days, based on a current time, 8:00 p.m., Thursday, May 15. In this example, the time unit is one day.

In comparing FIG. 4A with FIG. 4B, the time axis 410 included in the guide UI may be formed of a time unit with respect to a date corresponding to a current day (i.e. today) and a next day (i.e. tomorrow) in FIG. 4A which are close to the current time, and may be formed of a date unit with respect to a date after two days from a current day in FIG. 4B.

The controller 290 may control the display 240 to arrange and display the display items at the same time unit based on the time axis 410 of the guide UI. For example, the controller 290 may display the items according to a recommendation order of the broadcast contents. For broadcast content that is to be broadcasted today or tomorrow, the controller 290 may arrange the display items by determining the recommendation order of the broadcast content based on a time unit. For broadcast content that is to be broadcasted after two days from the current day, the controller 290 may arrange the display items by determining the recommendation order of the broadcast contents based on a date unit. As an example, for display items corresponding to a time of 8:00 p.m., today, the controller 290 may determine a recommendation order of the broadcast contents to be broadcasted at 8:00 p.m., today, from among broadcast contents received from a plurality of broadcast companies, and may arrange the display items based on the determined recommendation order. For display items corresponding to a time of May 18, the controller 290 may determine a recommendation order of the broadcast contents that are to be broadcasted on May 18 from among broadcast contents received from a plurality of broadcast companies, and arrange the display items based on the determined recommendation order.

The controller 290 may determine the recommendation order based on, for example, at least one of a user's broadcast content view history, an audience rating, a number of recommendations of other people, and the like. As an example, the controller 290 may determine the recommendation order by assigning a greater priority to the user's previous broadcast content view history rather than the audience rating and the number of recommendations from other people. For example, the controller 290 may control the display 240 to display broadcast content which a user has watched more frequently on an uppermost side from among broadcast contents of a same time unit, and display the remaining broadcast contents under the broadcast content which the user has watched more frequently, according to an order of the audience rating.

As another example, the controller 290 may determine the recommendation order based on the broadcast content recommendation information that is received from an external server and a user's previous broadcast content view history stored in the storage 250. The broadcast content recommendation information may include information about the audience rating and the number of recommendations of other people. The controller 290 may receive the broadcast content recommendation information from an external server at predetermined intervals, for example, every minute, every 10 minutes, every hour, and the like. The controller 290 may update the guide UI based on the received broadcast content recommendation information. For example, the controller may two-dimensionally arrange a plurality of items in rows of a same unit of time in the array, based on broadcast content recommendation information.

The display items included at the same time unit may be arranged according to the recommended order of the broadcast contents, but not limited thereto. That is, the display items included in the same time unit may be arranged according to another order. For example, the controller 290 may arrange the display items included at the same time unit according to a broadcast station, a channel number, and the like.

The controller 290 may control the display 240 to display a bar-shaped GUI on a side of the time axis included in the guide UI. The bar-shaped GUI may be used by a user to browse through different times and days of content.

Figure 5B:
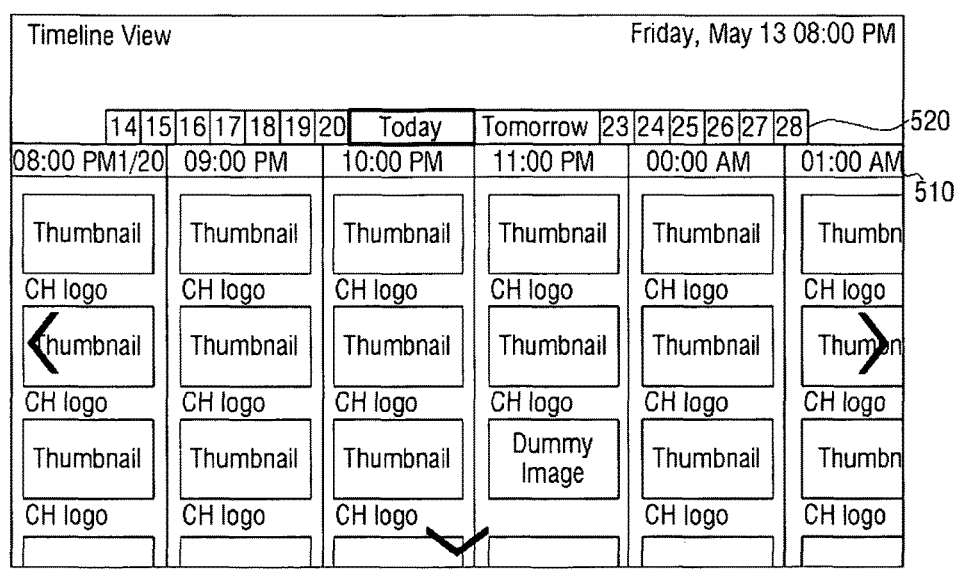

Referring to FIG. 5A, a user inputs a command for generating a date browsing bar through the input unit 280 while the guide UI is displayed. In response, the controller 290 controls the display 240 to display a date browsing bar 520 on an upper side of a time axis 510 of the guide UI, as shown in FIG. 5B. In this example, the date browsing bar 520 has areas divided according to a date unit, based on today. For example, as a user moves the selected date from left to right, or vice versa, the selected date shows up as Today, and the next day shows up as Tomorrow. Accordingly, a user can navigate through previous and future days to view broadcast content information. Furthermore, the controller 290 may arranged the content of each day based on recommendation information thereby providing a user with the improved convenience by recommending content that the user may enjoy.

In response to receiving a user command for selecting a certain area of the date browsing bar 520 through the input unit 280, the controller 290 may control the display 240 to display a display item included in a time unit corresponding to the selected area. For example, a user command for moving and selecting a highlight to an area corresponding to the $27^{th}$ may be input through the input unit 280 while the highlight is displayed on an area "Today" of the date browsing bar 520. In response, the controller 290 may control the display 240 to display the display items corresponding to a broadcast contents which is broadcasted on a date of "May 27" corresponding to the selected "27" according to the recommendation order.

As another example, a user command for selecting one of a plurality of display items may be input through the input unit 280. In response, the controller 290 may control the display 240 to display a list of functions related to a broadcast content corresponding to the selected display item at or near a side of the selected display item. The function list may vary depending upon a point of time at which the broadcast content is broadcasted and/or based on a type of the broadcast content.

A display item corresponding to currently broadcasted content may be selected through the input unit 280 from among a plurality of display items. In response, the controller 290 may display a function list 620 on a right side of the selected display item, as shown in FIG. 6A. In this example, the function list 620 includes a recording item, a detailed information item, a preferred program (or favorite) adding item, and a reproducing (i.e. play) item.

As another example, a display item corresponding to a broadcast item which was previously broadcasted may be selected through the input unit 280 from among a plurality of display items. In response, the controller 290 may display a function list 630 on a right side of the selected display item as shown in FIG. 6B. In this example, the function list 630 includes a reproducing item, a detailed information item, and a preferred program adding item.

As another example, a display item corresponding to a broadcast item which will be broadcasted in the future may be selected through the input unit 280 from among a plurality of display items. In response, the controller 290 may display a function list 640 on a right side of the selected display item as shown in FIG. 6C. In this example, the function list 640 includes a scheduled recording item, a scheduled viewing item, a detailed information item, and a preferred program adding item.

According to various aspects, a time axis may be formed of a time unit in the form of a day corresponding to today and tomorrow, and formed of a date unit with respect to a date in the past, a date in the present, and a date in the future, but is not limited thereto. A time axis may be formed of other time units. For example, as illustrated in FIG. 7, the time axis may be formed of a half-day time unit with respect to a date corresponding to today and tomorrow. Here, the time unit is formed of half-day units for days that are two days and three days from the current time, and a date unit of a day that is four days from the current time. As days elapse based on the current date, the time unit of the time axis may increase.

In the examples of FIGS. 4A-7, broadcast content is represented by display items which in these examples are thumbnail images. The display items may also be referred to as broadcast content items which are used to represent a summary of broadcast content or otherwise refer to broadcast content. Accordingly, the thumbnail images may be summarized representations of the broadcast content. For example, the thumbnail image may include a video image from the content, a video image from a previous content of the broadcast content, an image of an actor of the broadcast content, and the like.

An axis of time may be located in a row direction or a column direction of the array. The thumbnail images may be arranged in a two-dimensional order in an array of the UI such that each column or row represents one unit of time, for example, a day, a half-day, an hour, and the like. Each of the columns of the axis of time may be equal in width. As another example, each of the rows of the array may also be equal in width.

A user may navigate through the units of time to preview broadcast content represented by the thumbnail images. The broadcast content may be content that is yet to be played, currently being played, and previously played. In these examples, below the thumbnail images is a logo representing the channel of the respective broadcast content.

A user may move the cursor, or otherwise input a command through an input unit of the display apparatus to select or otherwise hover over a thumbnail image corresponding to a broadcast content. In response, a list of functions for the broadcast content may be displayed. For example, a scheduled playing time of the broadcast content, additional details about the broadcast content, an option to add the broadcast content to a user's favorites, and the like.

Figure 8:
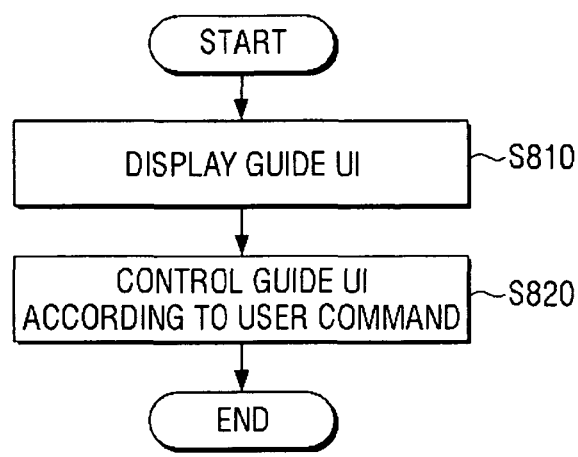
FIG. 8 is a flowchart illustrating a method of controlling a display apparatus according to an exemplary embodiment.

FIG. 8 is a flowchart illustrating a method of controlling a display apparatus according to an exemplary embodiment.

Referring to FIG. 8, the display apparatus 100 displays a guide UI providing information about broadcast content (S810). According to various aspects, the guide UI may include a time axis which is formed of different time units, and display items corresponding to broadcast content may be displayed based on the time axis. For example, the time axis included in the guide UI may be formed of a date unit with respect to a date in the past, formed of a time unit with respect to a date within a predetermined period from a current day (for example, tomorrow), formed of a date unit with respect to a date in the future after the predetermined period, and the like.

The display apparatus 100 controls the guide UI according to a user command (S820). For example, a bar-shaped GUI for browsing a time may be displayed on a side of the guide UI, and a user command for selecting a certain area of the bar-shaped GUI may be received. Accordingly, the display apparatus 100 may display an item included in a time unit corresponding to the selected area. As another example, in response to a user command for selecting one of a plurality of display items being received, the display apparatus 100 may display a list providing functions related to a broadcast content corresponding to the selected display item on a side of the selected display item.

As described above, the guide UI includes a time axis which is formed of different time units depending upon a date, and based on the current time. Accordingly, a user is able to search for a preferred broadcast content more easily even if the user does not know an exact time of a broadcast content that was broadcasted in the past or that will be broadcasted in the future.

According to various aspects, a plurality of units of time on the time axis may vary in size based on date at which the broadcast content is broadcast. For example, broadcast content items for a current day may be arranged in smaller units of time on the axis of time, such as hours, and broadcast content items for a plurality of preceding days and a plurality of days following the current day may be arranged in greater units of time on the axis of time, such as days. As another example, broadcast content items for a current day and one or more days within a predetermined range of the current day may be arranged in smaller units of time on the axis of time, and broadcast content items for days outside the predetermined range may be arranged in larger units of time on the axis of time.

The method of controlling a display apparatus according to the aforementioned various exemplary embodiments may be embodied as a program and provided to a display apparatus or an input device. In particular, a program including instructions executable by a processor to perform a method of controlling a display apparatus may be provided by being stored in a non-transitory computer readable medium.

The non-transitory computer readable medium refers to a medium which may store data permanently or semi-permanently rather than storing data for a short time such as a register, a cache, and a memory and may be readable by an apparatus. As an example, the above-described various applications and programs may be stored in the non-transitory computer readable medium like a compact disc (CD), a digital versatile disk (DVD), a hard disk, a BLU-RAY disk, a universal serial bus (USB), a memory card, a read-only memory (ROM), and the like, and provided therein.

As given above, although a few desirable exemplary embodiments have been shown and described, the present disclosure is not limited to the aforementioned particular exemplary embodiments, and could be variously modified and achieved by those skilled in the art to which the present disclosure pertains without deviating from the substance of the present disclosure which is claimed in the claims, and such modifications should not be understood separately from the technical concept or prospect of the present disclosure.

What is claimed is:

1. A display apparatus comprising:
   a display;
   an input interface configured to receive a user command; and
   a controller configured to control the display to display a broadcast time schedule according to the user command received through the input interface, the broadcast time schedule comprising a plurality of display items that correspond to a plurality of broadcast contents and are displayed on a time axis which is formed of different time units depending upon a date,
   wherein the time axis is formed of a first time zone including a current time and a second time zone outside the first time zone,
   wherein the time axis at the first time zone is divided according to an hour unit and the time axis at the second time zone is divided according to a date unit, and
   wherein the controller is further configured to control the display to display at least one display item corresponding to at least one recommended broadcast content on the time axis with respect to the date that is outside of a predetermined period including the current time.

2. The display apparatus of claim 1, wherein the controller is configured to arrange display items included at a same time unit on the time axis according to a recommended order of broadcast contents.

3. The display apparatus of claim 2, wherein the recommended order is determined based on at least one of a user's broadcast content view history, an audience rating, and a number of recommendations of other people.

4. The display apparatus of claim 2, further comprising:
   a communication interface configured to receive broadcast content recommendation information from an external server, at predetermined intervals,
   wherein the controller is configured to determine the recommended order using the broadcast content recommendation information received from the external server.

5. The display apparatus of claim 1, wherein the display is configured to display a bar-shaped graphic user interface (GUI) for browsing through a plurality of time units at a side of the time axis, and
   in response to a user command selecting an area of the bar-shaped GUI being received through the input interface, the controller is configured to control the display to display a display item included in a time unit corresponding to the selected area.

6. The display apparatus of claim 1, wherein, in response to a user command selecting a display item among the plurality of display items being received through the input interface, the controller is configured to control the display to display a list of functions for broadcast content corresponding to the selected display item at a side of the selected display item.

7. The display apparatus of claim 6, wherein the list of functions varies depending upon a point of time at which broadcast content corresponding to the selected display item is broadcasted.

8. The display apparatus of claim 6, wherein in response to a broadcast content corresponding to the selected display item being broadcasted previously, the list comprises at least one of a preferred broadcast adding item, a previous broadcast viewing item, and a broadcast information providing item,
   in response to a broadcast content corresponding to the selected display item being currently broadcasted, the list comprises at least one of a preferred broadcast adding item, a recording item, a broadcast viewing item, and a broadcast information providing item, and
   in response to a broadcast content corresponding to the selected display item being broadcasted in the future, the list comprises at least one of a preferred broadcast adding item, a scheduled recording item, a scheduled viewing item, and a broadcast information providing item.

9. A method of controlling a display apparatus, the method comprising:
   controlling a display to display a broadcast time schedule according to a user command received by the display apparatus, the broadcast time schedule comprising a plurality of display items that correspond to a plurality of broadcast contents and are displayed on a time axis which is formed of different time units depending upon a date,
   wherein the time axis is formed of a first time zone including a current time and a second time zone outside the first time zone, and
   wherein the controlling the display comprises controlling the display to display at least one display item corresponding to at least one recommended broadcast content on the time axis with respect to the date that is outside of a predetermined period including the current time.

10. The method of claim 9, wherein the displaying comprises arranging display items included at a same time unit on the time axis according to a recommended order of broadcast contents.

11. The method of claim 10, wherein the recommended order is determined based on at least one of a user's broadcast content view history, an audience rating, and a number of recommendations of other people.

12. The method of claim 10, wherein the recommended order is determined by broadcast content recommendation information received from an external server at predetermined intervals.

13. The method of claim 9, wherein the displaying comprises displaying a bar-shaped graphic user interface (GUI) for browsing through a plurality of time units at a side of the time axis, and
   in response to a user command selecting an area of the bar-shaped GUI being received, the controlling comprises displaying a display item included in a time unit corresponding to the selected area.

14. The method of claim 9, wherein, in response to a user command selecting a display item among the plurality of display items being received, the controlling comprises displaying a list of functions for broadcast content corresponding to the selected display item at a side of the selected display item.

15. The method of claim 14, wherein the list of functions varies depending upon a point of time at which broadcast content corresponding to the selected display item is broadcasted.

16. The method of claim 15, wherein in response to a broadcast content being broadcasted previously, the list comprises at least one of a preferred broadcast adding item, a previous broadcast viewing item, and a broadcast information providing item, in response to a broadcast content corresponding to the selected display item being currently broadcasted, the list comprises at least one of a preferred broadcast adding item, a recording item, a broadcast viewing item, and a broadcast information providing item, and in response to a broadcast content corresponding to the selected display item being broadcasted in the future, the list comprises at least one of a preferred broadcast adding item, a scheduled recording item, a scheduled viewing item, and a broadcast information providing item.

17. A display apparatus comprising:

a display; and a controller configured to display a broadcast time schedule, the broadcast time schedule comprising a plurality of display items that correspond to a plurality of broadcast content items within an array and are displayed on a time axis which is formed of different time units depending upon a date, each broadcast content item comprising a representation of broadcast content and being two-dimensionally arranged in the array based on a unit of time at which the respective broadcast content is broadcast, wherein the time axis is formed of a first time zone including a current time and a second time zone outside the first time zone, wherein the time axis at the first time zone is divided according to an hour unit and the time axis at the second time zone is divided according to a date unit, and wherein the controller is further configured to control the display to display at least one broadcast content item corresponding to at least one recommended broadcast content on the time axis with respect to the date that is outside of a predetermined period including the current time.

18. The display apparatus of claim 17, wherein broadcast content items for a current day are arranged in hour units on the time axis, and broadcast content items for a plurality of preceding days and a plurality of days following the current day are arranged in date units on the time axis.

19. The display apparatus of claim 17, wherein the plurality of broadcast content items comprise a plurality of thumbnail images that comprise summarized representations of broadcast content.

20. The display apparatus of claim 17, wherein the array comprises an electronic program guide (EPG) in which units of time are arranged in a column direction of the array, and a width of each column of the EPG is a same size.

21. The display apparatus of claim 17, wherein the controller is configured to two-dimensionally arrange a plurality of items corresponding to a plurality of rows in a column of the array corresponding to a same unit of time, based on at least one of a user preference of the broadcast content and recommendation information of the broadcast content.

* * * * *